(12) United States Patent
Kimura et al.

(10) Patent No.: US 8,009,523 B2
(45) Date of Patent: Aug. 30, 2011

(54) OPTICAL PICKUP AND METHOD FOR MANUFACTURING THE SAME

(75) Inventors: Katsuhiko Kimura, Kasumigaura (JP);
Yoshihiro Satou, Yokohama (JP);
Junichi Senga, Yokohama (JP)

(73) Assignee: Hitachi Media Electronics Co., Ltd., Iwate-ken (JP)

( * ) Notice: Subject to any disclaimer, the term of this patent is extended or adjusted under 35 U.S.C. 154(b) by 881 days.

(21) Appl. No.: 12/018,463

(22) Filed: Jan. 23, 2008

(65) Prior Publication Data
US 2008/0253239 A1  Oct. 16, 2008

(30) Foreign Application Priority Data
Apr. 11, 2007 (JP) ................. 2007-103393

(51) Int. Cl.
*G11B 7/00* (2006.01)
(52) U.S. Cl. ................ 369/44.14; 369/44.15; 369/44.16
(58) Field of Classification Search ............... 369/44.14, 369/44.15, 44.16
See application file for complete search history.

(56) References Cited

U.S. PATENT DOCUMENTS

| | | | |
|---|---|---|---|
| 5,926,327 A | 7/1999 | Bae | |
| 6,721,110 B2 | 4/2004 | Song et al. | |
| 6,785,065 B1 | 8/2004 | Song et al. | |
| 2006/0280060 A1* | 12/2006 | Imai et al. | 369/44.14 |

FOREIGN PATENT DOCUMENTS

| | | |
|---|---|---|
| CN | 1797559 | 7/2006 |
| JP | 5-62024 | 8/1993 |
| JP | 11-73664 | 3/1999 |
| JP | 2003-6901 | 1/2003 |
| JP | 2006-344276 | 12/2006 |
| WO | WO 03102929 A2 * | 12/2003 |

* cited by examiner

*Primary Examiner* — Jorge L Ortiz Criado
(74) *Attorney, Agent, or Firm* — Antonelli, Terry, Stout & Kraus, LLP.

(57) ABSTRACT

To increase the speed of operations and improve vibration properties by rotating holders to wind coils in objective lens driving means of an optical pickup. In an optical pickup wherein a tracking coil and two focusing coils are wound on the same surface of a coil holder, the coil holder includes a tracking coil holder and two focusing coil holders, and each of the tracking coil holder and two focusing coil holders has a hole passing through the center of each coil.

6 Claims, 6 Drawing Sheets

A – A cross section

OPTICAL PICKUP AND METHOD FOR MANUFACTURING THE SAME

BACKGROUND OF THE INVENTION

1. Field of the Invention

The present invention relates to an optical pickup equipped in an optical disc drive for reading information recorded on the recording surface of an optical disc, or recording information on an optical disc.

2. Background Art

General objective lens driving means equipped in the optical pickup of an optical disc drive is composed of a holder for holding an objective lens, focusing coils and a tracking coil mounted in holders, supporting members for supporting movable portions including these, and a yoke and magnets.

When a driving current is applied to the focusing coils, by the electromagnetic force generated by the action with magnetic flux from the magnets, the movable portions are driven in the focusing direction, which is a direction wherein the movable portions approach to or move away from the surface of the optical disc. Similarly, when a driving current is applied to the tracking coil, by the electromagnetic force generated by the action with magnetic flux from the magnets, the movable portions are driven in the tracking direction, which is a direction of the radius of the optical disc.

When the focusing coils and the tracking coil are installed in the holders, since the method wherein the coil is directly wound on the holder excels in assemble workability, it is applied to actual machines in some examples.

An example of conventional structures of objective lens driving means in optical pickups using this method is described in Patent Document 1. In Patent Document 1, a configuration wherein a lens holder is composed by bonding an upper piece and a lower piece, a tracking coil is wound on the upper piece, and focusing coils are wound on two bobbin sections of the lower piece, is described.

[Patent Document 1] JP Patent Publication (Kokai) No. 2006-344276A (p. 5, FIG. 2)

In Patent Document 1, since the lower piece of the lens holder has two bobbin sections, it is required to fix the lower piece of the lens holder, and to wind a coil wire around each bobbin section while moving the coil wire when focusing coils are wound.

An object of the present invention is to provide an optical pickup that excels in assemble workability.

SUMMARY OF THE INVENTION

To achieve the above-described object, the present invention is constituted as follows:

In an optical pickup wherein a tracking coil and two focusing coils are wound on the same surfaces of coil holders, the coil holders include a tracking coil holder and two focusing coil holders, and each of the tracking coil holder and two focusing coil holders has a hole passing through the center of each coil.

According to the present invention, when a tracking coil and two focusing coils are wound on the same surface of the coil holder, since the coil holder can be rotated around the hole formed in each coil holder to wind coils, the speed of the operation can be elevated. At this time, since the tracking coil and two focusing coils are wound on the same surface of the coil holder, there is no need to dispose a facing yoke, the stiffness of the coil holders can be secured, and vibration can be suppressed.

By overlapping and adhering the protruded portions of the two focusing coil holders to the peripheral portion of the tracking coil holder, the two focusing coil holders can be surely joined to the tracking coil holder.

Also by making one of the protruded portions of the two focusing coil holders L-shaped, and making the other inverted L-shaped, the discrimination of the two focusing coil holders can be facilitated.

DETAILED DESCRIPTION OF THE PREFERRED EMBODIMENTS

Figure 1:
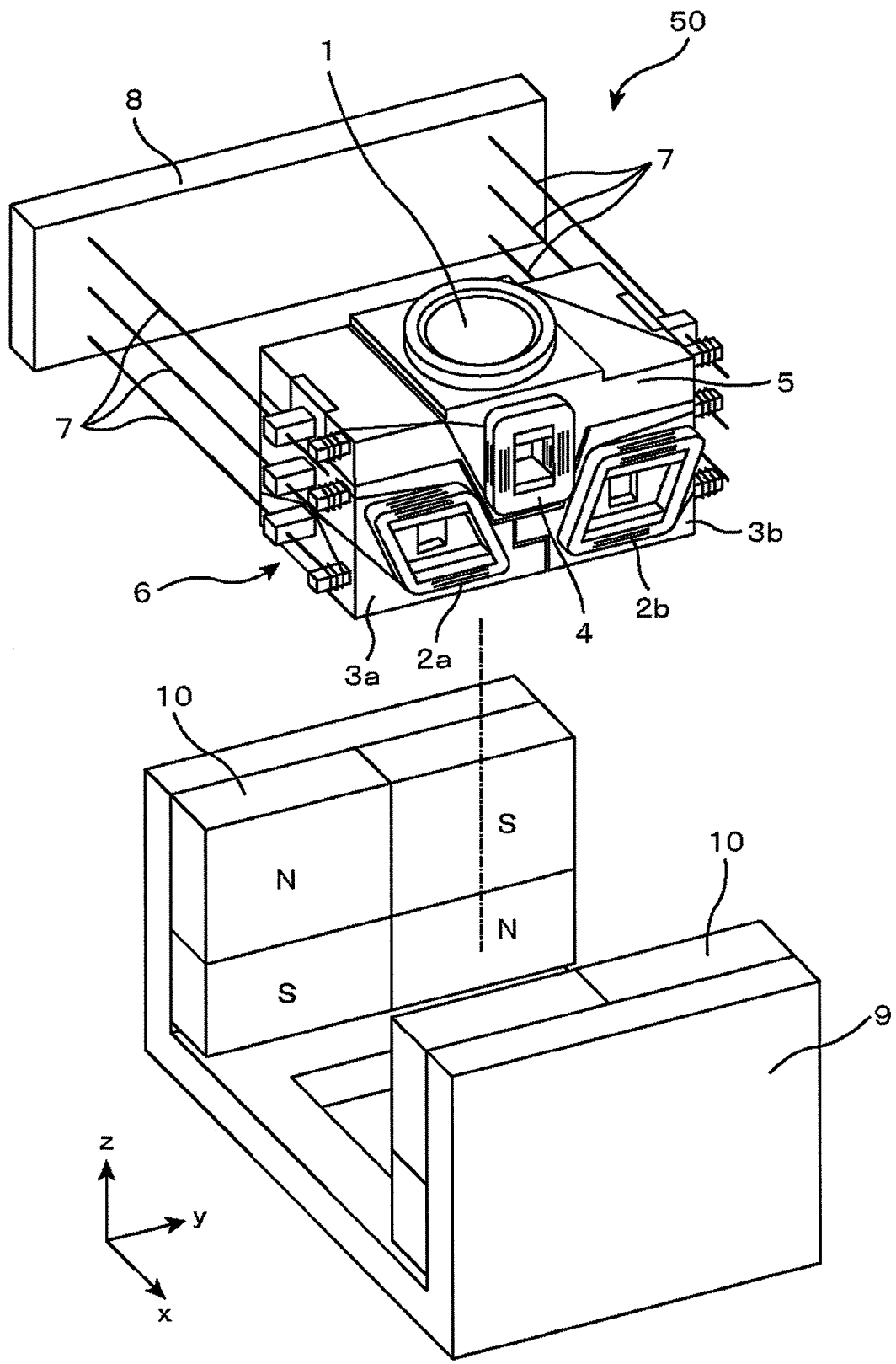
FIG. 1 is a diagram illustrating an embodiment of objective lens driving means of an optical pickup according to the present invention.

An embodiment of the present invention will be described below.

An embodiment of an optical pickup according to the present invention will be described referring to the drawings.

Figure 7:
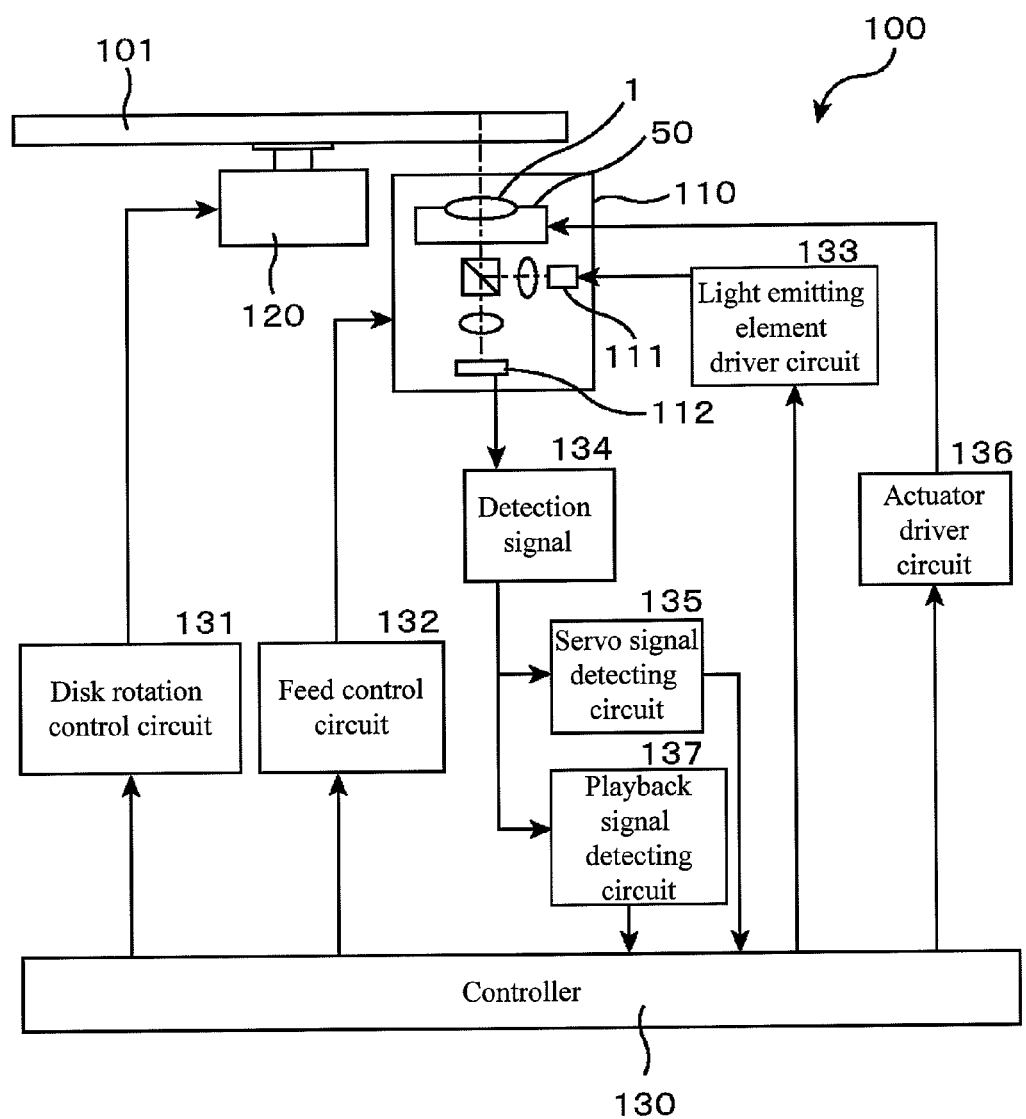
FIG. 7 is a block diagram of an embodiment of an optical disc drive according to the present invention.

Firstly, an optical disc drive 100 equipped with an optical pickup 110 will be described referring to the block diagram shown in FIG. 7. The optical disc drive 100 is equipped with a spindle motor 120 for rotating the optical disc 101, an optical pickup 110 for reading information from the optical disc 101 or writing information on the optical disc 101, and a controller 130 for controlling these. The optical pickup 110 has objective lens driving means 50 described in detail later, and optical parts, such as a laser diode 111.

The disk rotation control circuit 131 connected to the controller 130 receives command from the controller 130, and drives and rotates the spindle motor 120 equipped with the optical disc 101. The feed control circuit 132 connected to the controller 130 receives command from the controller 130, and moves the optical pickup 110 in the radius direction of the optical disc 101.

To the laser diode 111 mounted in the optical pickup 110, a light emitting element driver circuit 133 is connected. When a driving signal is transmitted from the light emitting element driver circuit 133 to the laser diode 111 upon receiving the command from the controller 130, the laser diode 111 emits laser beams. The laser beams are condensed on the optical disc 101 by an objective lens 1. The condensed laser beams are reflected by the optical disc 101, pass through the objective lens 1, and enter a photo-detector 112. The detection signal 134 obtained in the photo-detector 112 is transmitted to the servo signal detecting circuit 135 and the playback signal detecting circuit 137. On the basis of the detection signal 134 transmitted to the servo signal detecting circuit 135, a servo signal is created, and is inputted into the actuator driver circuit 136.

The actuator driver circuit 136 inputs a driving signal into the objective lens driving means 50 of the optical pickup 110 to control the alignment of the objective lens 1.

On the other hand, a playback signal is created from the detection signal 134 inputted into the playback signal detecting circuit 137, and the information in the optical disc 101 is played back.

The detail of the objective lens driving means 50 in the optical pickup 110 shown in FIG. 7 will be described below.

FIG. 1 is a perspective view of an objective lens driving means 50 in the optical pickup 110 according to the present invention. In FIG. 1, the z direction is the focusing direction wherein the objective lens 1 is moved closer to or apart from the surface of an optical disc along the optical axis of the objective lens 1; the y direction is the tracking direction wherein the objective lens 1 is moved in the radius direction of the optical disc. The direction orthogonal to both the y direction and the z direction is the x direction.

A coil holder for holding focusing coils and a tracking coil therein is divided into two focusing coil holders 3a and 3b, and a tracking coil holder 5; and is composed by joining them.

The objective lens 1 is mounted in the tracking coil holder 5. The tracking coil holder 5 wherein the objective lens 1 is mounted and the tracking coil 4 is wound, and two focusing coil holders 3a and 3b wherein two focusing coils 2a and 2b are wound respectively constitute a movable portion 6.

The movable portion 6 is supported by supporting members 7 whose ends are fixed to the movable portion 6 and other ends are connected to a fixed portion 8 so as to be displaceable from the fixed portion 8.

The two focusing coils 2a and 2b and the tracking coil 4 are electrically connected to an end of each of supporting members 7 by solder or the like, and a current is supplied from the exterior via the supporting members 7.

Magnets 10 are fixed to a yoke 9 composed of a magnetic material facing the two focusing coils 2a and 2b and the tracking coil 4. The magnet 10 is split into four magnetic poles at the boundaries intersecting along the focusing direction and the tracking direction. The magnets 10 may be a magnet magnetized in four poles, may be the combination of four single-pole magnets, or may be the combination of two magnets magnetized in two poles.

In such a configuration, when a current is inputted in the two focusing coils 2a and 2b, a driving force in the focusing direction is generated, and the movable portions 6 move in the focusing direction. When a current is inputted in the tracking coil 4, a driving force in the tracking direction is generated, and the movable portions 6 move in the tracking direction.

In the state wherein the two focusing coil holders 3a and 3b are joined with the tracking coil holder 5, since the two focusing coils 2a and 2b and the tracking coil 4 are wound on the same surface of the coil holder, facing the magnets 10, no facing yoke is required. Therefore, since no openings are required in addition to the light path to the objective lens 1 on the plane perpendicular to the focusing direction of the tracking coil holder 5, the stiffness of the movable portions 6 can be elevated.

Here, it is impossible to wind the two focusing coils 2a and 2b and the tracking coil 4 on the same surface of the coil holder while rotating the coil holder, because of the interference of coils with one another if the coil holder has a single shape. Therefore, in the present invention, the coil holder is divided into two focusing coil holders 3a and 3b and a tracking coil holder 5 to enable the focusing coils and the tracking coil to be wound on respective coil holders.

Figure 2:
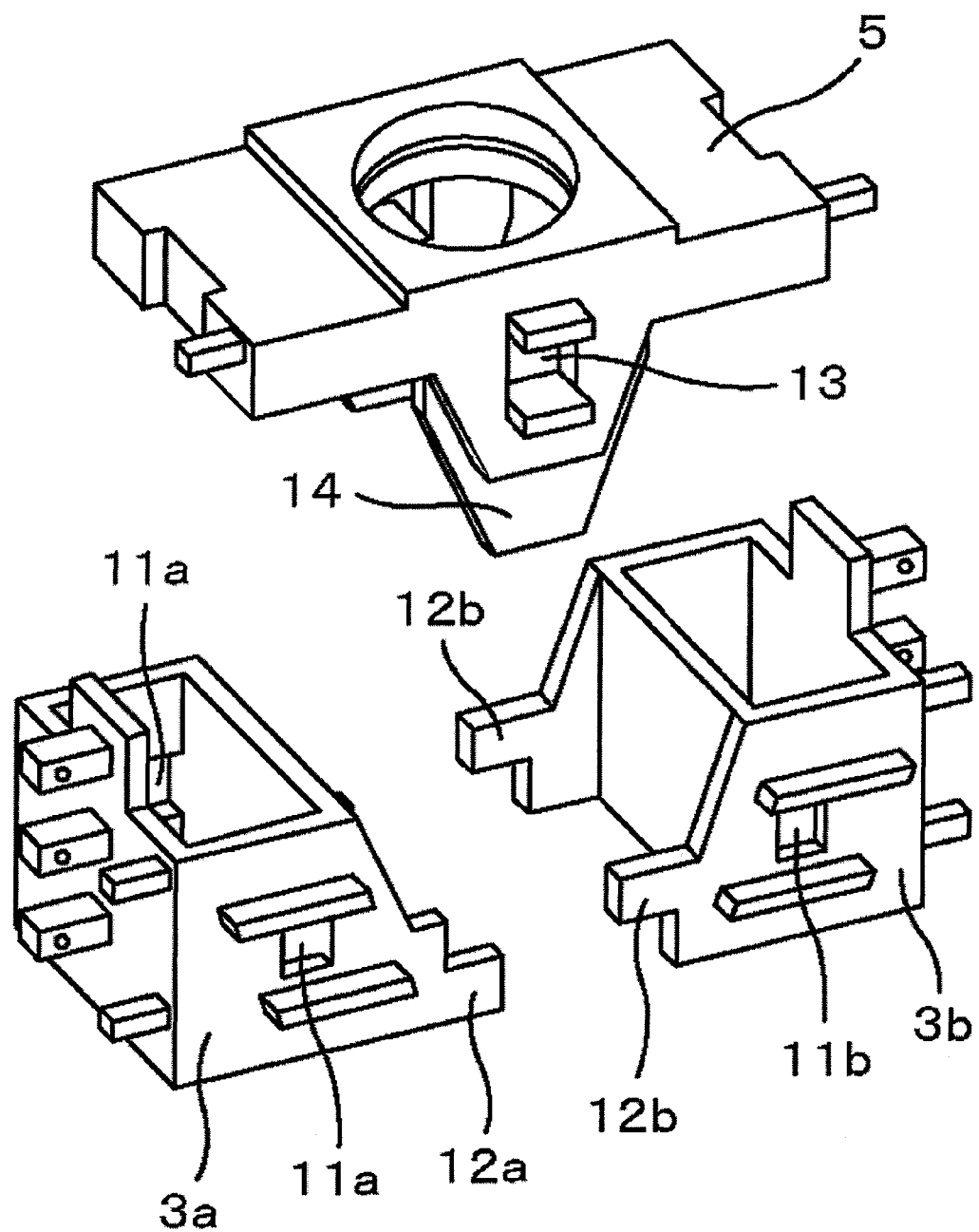
FIG. 2 is a diagram illustrating focusing coil holders and a tracking coil holder of the objective lens driving means shown in FIG. 1.

FIG. 2 is a perspective view showing the two focusing coil holders 3a and 3b and the tracking coil holder 5 in the state wherein each coil has not been wound.

The two focusing coil holders 3a and 3b have winding sections for the two focusing coils 2a and 2b, respectively, on the side parallel to the focusing direction and the tracking direction, and have holes 11a and 11b passing through the centers of the focusing coils 2a and 2b inside the winding sections, respectively. The two focusing coil holders 3a and 3b have protruded portions 12a and 12b facing one another from the winding sections of the focusing coils 2a and 2b toward the tracking direction.

The tracking coil holder 5 has the winding section for the tracking coil 4 on the side parallel to the focusing direction and the tracking direction, and has a hole 13 passing through the center of the tracking coil 4 inside the winding section. The tracking coil holder 5 also has a peripheral portion 14 a step lower than the mounting surface of the tracking coil 4 around the winding section of the tracking coil 4.

Figure 3:
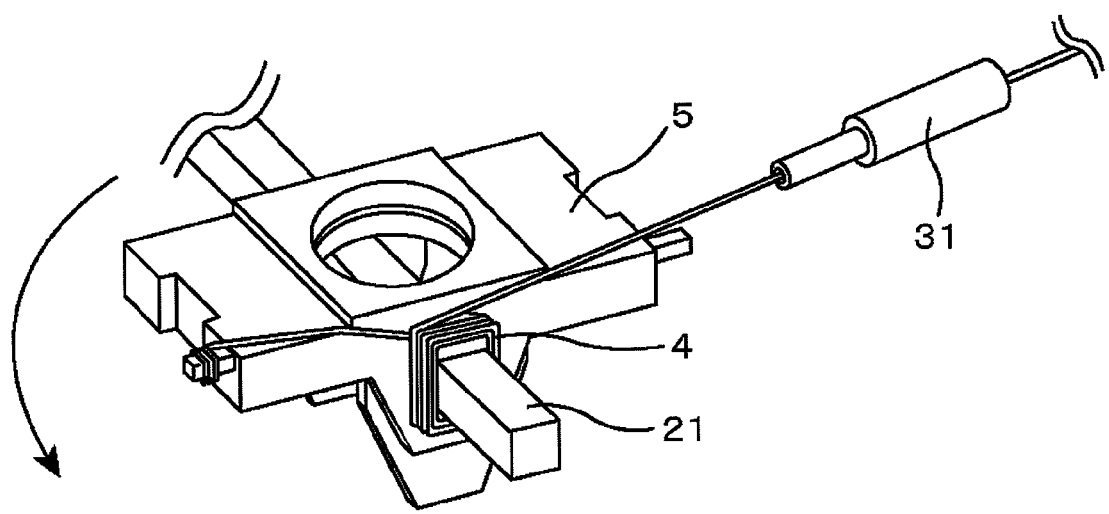
FIG. 3 is a diagram illustrating a state wherein a tracking coil is being wound in a tracking coil holder of the objective lens driving means shown in FIG. 1.

FIG. 3 shows a state wherein the tracking coil 4 is being wound on the tracking coil holder 5. In the first step, the tracking coil holder 5 is fixed to a winding shaft 21 by passing the winding shaft 21 into the hole 13. Thereafter, in the second step, an end of the coil wire guided by a nozzle 31 is wound around the terminal section of the tracking coil holder 5, and by rotating the tracking coil holder 5 fixed to the winding shaft 21, the coil wire is wound on the tracking coil holder 5 to form the tracking coil 4.

Although not shown in the drawing here, in the third step, after the winding shaft is passed into the holes 11a and 11b of the two focusing coil holders 3a and 3b, in the fourth step, each focusing coil holder is rotated and a coil wire is wound on each coil holder to form focusing coils 2a and 2b.

Figure 4:
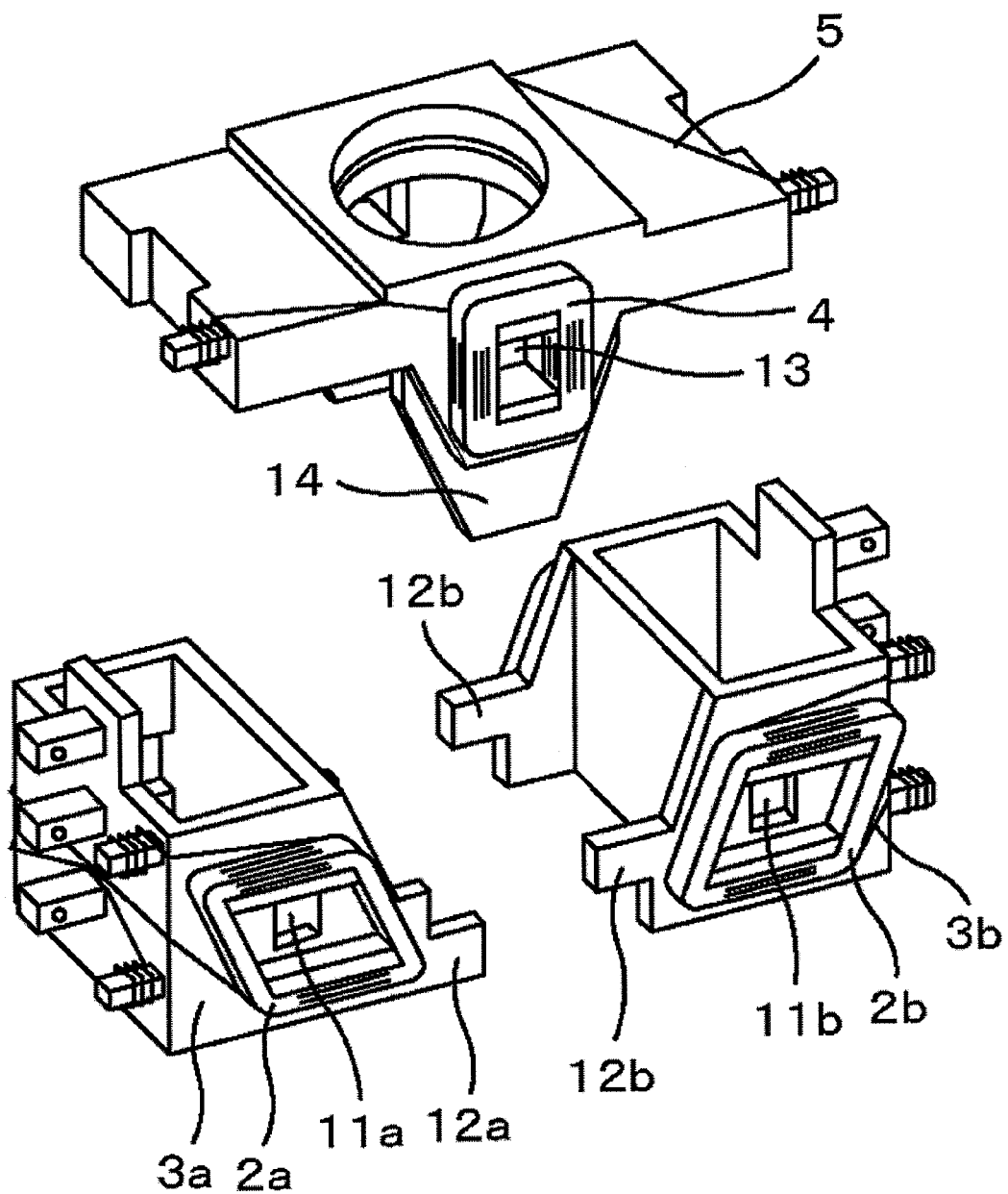
FIG. 4 is a diagram illustrating a state wherein respective coils are wound in the focusing coil holders and a tracking coil holder of the objective lens driving means shown in FIG. 1.

The state wherein respective coils have been wound on the focusing coil holders 3a and 3b and the tracking coil holder 5 is shown in FIG. 4.

As has been described, by dividing the coil holder into the two focusing coil holders 3a and 3b and the tracking coil holder 5, and forming a hole passing through each coil, respective coils can be wound by rotating the coil holders, and the speed of the operation can be elevated.

In the fifth step, after the above-described second and fourth steps, the tracking coil holder 5 and the two focusing coil holders 3a and 3b are adhered to one another to form a coil holder.

Figure 5:
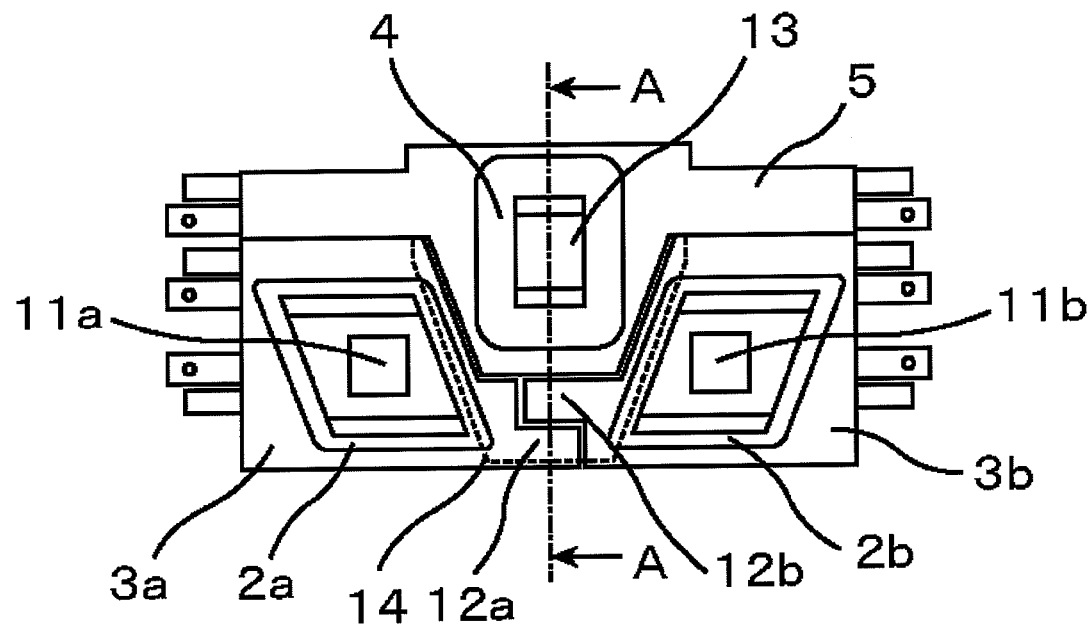
FIG. 5 is a diagram illustrating a state wherein the focusing coil holders and a tracking coil holder of the objective lens driving means shown in FIG. 1 are connected.
Figure 6:
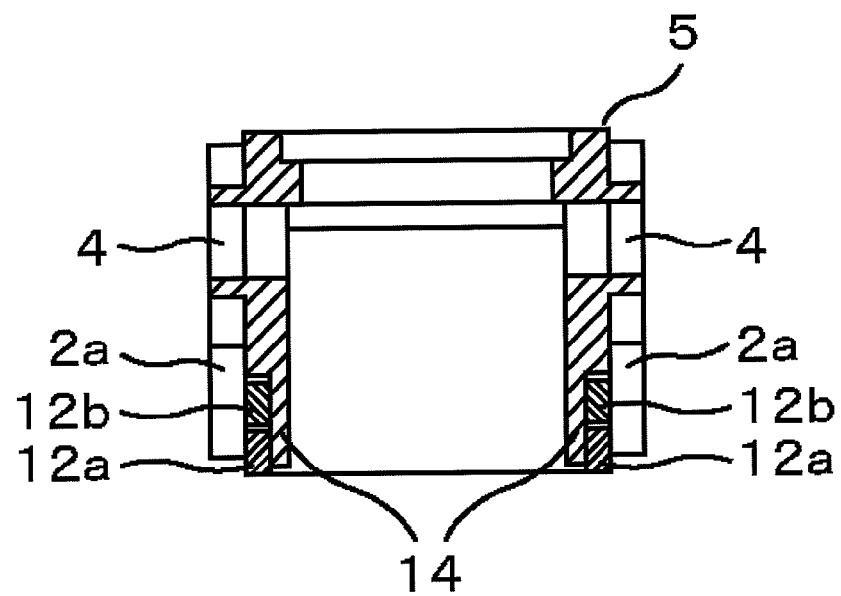
FIG. 6 is a sectional view illustrating a state wherein the focusing coil holders and a tracking coil holder of the objective lens driving means shown in FIG. 1 are connected.

FIG. 5 shows the state wherein the two focusing coil holders 3a and 3b are joined to the tracking coil holder 5. FIG. 6 shows the A-A cross section of the joined state shown in FIG. 5. The two focusing coil holders 3a and 3b are joined to the tracking coil holder 5 by overlapping and disposing the protruded portion 12a of the focusing coil holder 3a and the protruded portion 12b of the focusing coil holder 3b on the peripheral portion 14 of the tracking coil holder 5, and adhering the focusing coil holders 3a and 3b and the tracking coil holder 5 at the peripheral portion 14 of the tracking coil holder 5.

Since the peripheral portion 14 of the tracking coil holder 5, and the protruded portion 12a of the focusing coil holder 3a and the protruded portion 12b of the focusing coil holder 3b are adhered so that the surfaces overlap one another, the adhesive strength is improved, and joining can be surely performed.

The protruded portion 12a of the focusing coil holder 3a is made to be L-shaped, and the protruded portion 12b of the focusing coil holder 3b is made to be inverted L-shaped so as to be engaged with the L-shaped protruded portion 12a of the focusing coil holder 3a. By thus making one protruded portion L-shaped and the other inverted L-shaped, the discrimination and the assembly of the two focusing coil holders 3a and 3b can be facilitated.

According to the present invention, an optical pickup that can elevate the speed of the operation to wind coils on the tracking coil holder and the two focusing coil holders and has good vibration property can be provided. In addition, the tracking coil holder and the two focusing coil holders can be surely joined, and the discrimination of the two focusing coil holders can be facilitated.

The present invention can be used in the optical pickup of an optical disc drive.

What is claimed is:

1. An optical pickup comprising a tracking coil and two focusing coils wound on the same surface of a coil holder; wherein said coil holder comprises a tracking coil holder and two focusing coil holders; and each of said tracking coil holder and two focusing coil holders has a hole passing through the center of each coil; each of said two focusing coil holders has a protruded portion protruded from a winding section for said focusing coil toward a tracking direction; said tracking coil holder has a peripheral portion one step lower than a tracking coil winding plane around said tracking coil; said protruded portions of said two focusing coil holders are overlapped and disposed on the peripheral portion of said tracking coil holder; and said tracking coil holder is adhered to said two focusing coil holders at the peripheral portion of said tracking coil holder.

2. The optical pickup according to claim 1, wherein said coil holder is composed of said tracking coil holder and two focusing coil holders adhered to each other.

3. The optical pickup according to claim 1, wherein said protruded portions of said two focusing coil holders are facing one another toward the tracking direction, and said protruded portion of said one of said two focusing coil holders interlocks with said protruded portion of said another of said two focusing coil holders.

4. The optical pickup according to claim 2, wherein said protruded portions of said two focusing coil holders are facing one another toward the tracking direction, and said protruded portion of said one of said two focusing coil holders interlocks with said protruded portion of said another of said two focusing coil holders.

5. A method for manufacturing an optical pickup according to claim 1, comprising the steps of:
   forming the tracking coil and the two focusing coils so as to be wound on the same surface of the coil holder in which the coil holder includes a tracking coil holder and two focusing coil holders;
   forming the tracking coil holder and the two focusing coil holders so as to have a hole passing through the centers thereof;
   passing a winding shaft through the hole of the tracking coil holder and the holes of the two focusing coil holders;
   rotating the tracking coil holder and the two focusing coil holders to wind a coil wire thereon so as to form the tracking coil and the two focusing coils;
   forming each of the two focusing coil holders to have a protruded portion protruded from a winding section for the focusing coil toward a tracking direction;
   forming the tracking coil holder to have a peripheral portion one step lower than a tracking coil winding plane around the tracking coil;
   disposing the protruded portions of the two focusing coil holders so as to be overlapped on the peripheral portion of the tracking coil holder; and
   adhering the tracking coil holder to the two focusing coil holders at the peripheral portion of the tracking coil holder so as to form the optical pickup having the tracking coil and the two focusing coils wound on the same surface of the coil holder.

6. A method for manufacturing an optical pickup comprising the steps of:
   forming a tracking coil and two focusing coils so as to be wound on a same surface of a coil holder in which the coil holder includes a tracking coil holder and two focusing coil holders;
   forming the tracking coil holder and the two focusing coil holders so as to have a hole passing through the centers thereof;
   passing a winding shaft through the hole of the tracking coil holder and the holes of the two focusing coil holders;
   rotating the tracking coil holder and the two focusing coil holders to wind a coil wire so as to form the tracking coil and the two focusing coils;
   forming each of the two focusing coil holders to have a protruded portion protruded from a winding section for the focusing coil toward a tracking direction;
   forming the tracking coil holder to have a peripheral portion one step lower than a tracking coil winding plane around the tracking coil;
   disposing the protruded portions of the two focusing coil holders so as to be overlapped on the peripheral portion of the tracking coil holder; and
   adhering the tracking coil holder to the two focusing coil holders at the peripheral portion of the tracking coil holder so as to form the optical pickup having the tracking coil and the two focusing coils wound on the same surface of the coil holder.

* * * * *